United States Patent
Subramanian et al.

(10) Patent No.: US 11,815,917 B2
(45) Date of Patent: *Nov. 14, 2023

(54) SYSTEMS AND METHODS FOR ELECTRONIC MONITORING AND PROTECTION

(71) Applicant: DISH NETWORK L.L.C., Englewood, CO (US)

(72) Inventors: Prakash Subramanian, Littleton, CO (US); Nicholas Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,834

(22) Filed: Oct. 11, 2022

(65) Prior Publication Data

US 2023/0032027 A1 Feb. 2, 2023

Related U.S. Application Data

(63) Continuation of application No. 16/941,235, filed on Jul. 28, 2020, now Pat. No. 11,500,396.

(51) Int. Cl.
| | |
|---|---|
| G06F 16/22 | (2019.01) |
| H04N 7/18 | (2006.01) |
| G08B 13/196 | (2006.01) |
| G08B 3/10 | (2006.01) |
| G06V 20/52 | (2022.01) |
| G06V 40/10 | (2022.01) |
| G05D 1/12 | (2006.01) |
| G07C 9/00 | (2020.01) |
| G05D 1/00 | (2006.01) |

(52) U.S. Cl.
CPC ............. *G05D 1/12* (2013.01); *G05D 1/0094* (2013.01); *G06F 16/22* (2019.01); *G06V 20/52* (2022.01); *G06V 40/10* (2022.01); *G07C 9/00174* (2013.01); *G08B 3/10* (2013.01); *G08B 13/1966* (2013.01); *G08B 13/19652* (2013.01); *H04N 7/181* (2013.01)

(58) Field of Classification Search
CPC ........ G05D 1/12; G05D 1/0094; G05D 1/101; G06F 16/22; G06V 20/52; G06V 40/10; G06V 10/82; G06V 40/172; G07C 9/00174; G07C 9/20; G08B 3/10; G08B 13/19652; G08B 13/1966; G08B 26/004; G08B 29/188; H04N 7/181; H04N 7/18
See application file for complete search history.

(56) References Cited

U.S. PATENT DOCUMENTS

| | | |
|---|---|---|
| 2011/0046920 A1 | 2/2011 | Amis |
| 2012/0268269 A1 | 10/2012 | Doyle |
| 2014/0028457 A1 | 1/2014 | Reinpoldt et al. |
| 2016/0071399 A1 | 3/2016 | Altman et al. |
| 2017/0353763 A1 | 12/2017 | Ozawa |
| 2018/0025563 A1 | 1/2018 | Kerning et al. |

(Continued)

*Primary Examiner* — Jared Walker
(74) *Attorney, Agent, or Firm* — Jeremiah J. Baunach; VLP Law Group LLP

(57) ABSTRACT

An electronic monitoring and protection system which obtains permission from each of a plurality of users to access security data from one or more monitoring devices. The electronic monitoring and protection system using the security data to determine a threat level posed to a person to be protected, and initiating an action if the threat level exceeds a predetermined threshold.

20 Claims, 8 Drawing Sheets

(56) References Cited

U.S. PATENT DOCUMENTS

| | | |
|---|---|---|
| 2018/0053394 A1 | 2/2018 | Gersten |
| 2018/0268674 A1 | 9/2018 | Siminoff |
| 2019/0023207 A1 | 1/2019 | Lambermont et al. |
| 2019/0215395 A1 | 7/2019 | Melendez et al. |
| 2020/0057885 A1 | 2/2020 | Rao et al. |
| 2020/0202184 A1 | 6/2020 | Shrestha et al. | danger index table

| Subject | Criminal Record | Number of Dangerous Interactions | Frequency of curse words | Group Affiliations | Danger Index |
|---|---|---|---|---|---|
| 1111 | One guilty plea for speeding | 1 | 1 in 20 words | Autocross club of America; St. Peter and Paul Church volunteers | 4 |
| 2222 | Two convictions for assault and One conviction for burglary | 7 | 1 in 5 words | Rioters of America; Supreme Prison Gang; Lockpickers of America | 10 |
| 3333 | None | 0 | 1 in 20 words | St. Peter and Paul Church volunteers; Rotary Club of Suburbia | 2 |
| ... | ... | ... | ... | ... | ... |
| 510 | 511 | 512 | 513 | 514 | 515 |

SYSTEMS AND METHODS FOR ELECTRONIC MONITORING AND PROTECTION

BRIEF SUMMARY

Home security systems allow homeowners to monitor and secure their home, in addition to ensuring the members of their household are safe. However, home security systems are unable to monitor and secure areas outside of the homeowner's property. Additionally, systems to monitor areas spanning entire neighborhoods require a large investment to install sufficient monitoring devices. Furthermore, these systems are unable to leverage the infrastructure already in use by homeowners in order to monitor their own homes.

The embodiments disclosed herein help solve the above technical problems and improve monitoring and security technology by addressing the issues above by providing a technical solution that uses auditory, visual, and other security data from existing home security systems and monitoring devices of different individuals to monitor and secure an area and protect individual people. Additionally, the embodiments disclosed herein are further able to increase the speed and accuracy of information sharing between disparate home security systems. In some embodiments, an electronic monitoring and protection system obtains permission to access security devices owned and operated by one or more users. In some embodiments, the electronic monitoring and protection system identifies subjects and assigns a danger index to each subject. In some embodiments, the electronic monitoring and protection system receives an indication of a person to be protected and determines a threat level for the person to be protected. In some embodiments, the electronic monitoring and protection system deploys a drone when the threat level exceeds a predetermined threshold.

BRIEF DESCRIPTION OF THE SEVERAL VIEWS OF THE DRAWINGS

FIG. 5 is a table diagram showing sample contents of a danger index table used by the electronic monitoring and protection system, according to various embodiments described herein.

DETAILED DESCRIPTION

Figure 1:
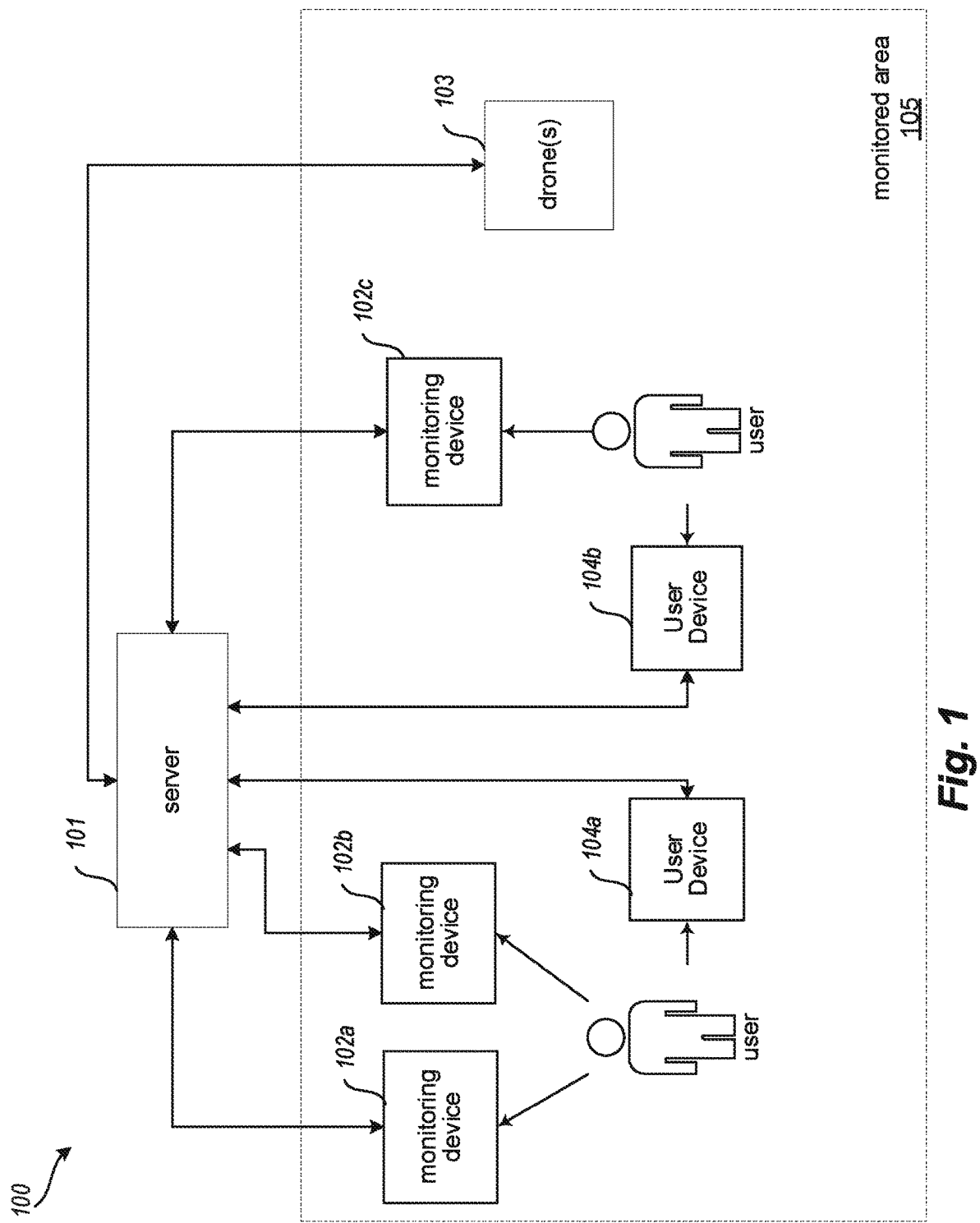
FIG. 1 is a diagram depicting an example electronic monitoring and protection system and a monitored area in which an electronic monitoring and protection system may be implemented.

In providing security and monitoring services to users, security systems generally cannot obtain security data from other, separate, security devices. Due to this limitation, it is difficult to monitor large areas without investing significant resources into creating the security system. Furthermore, security systems are limited to monitoring areas defined by individual users, and therefore cannot provide protection to an individual when the individual leaves the monitoring area. Finally, access to traditional security systems is limited to users who own or operate the security system, which increases the difficulty of monitoring an individual after they have left the coverage area for their own security system.

The embodiments disclosed herein help solve the above technical problems and improve monitoring and security technology by addressing the issues above by providing a technical solution that uses auditory, visual, and other security data (collectively "security data") from existing home security systems and individual monitoring devices, such as cell phones and other mobile devices, to monitor and secure an area and thereby increase the speed and accuracy of information sharing between disparate home security systems. In some embodiments, an electronic monitoring and protection system obtains permissions from one or more users to access security data obtained by various monitoring devices. After obtaining the security data, the system for crowd-sourced monitoring uses the security data to identify one or more subjects and assigns each subject a representation of the potential threat posed by the subject (a "danger index") based on one or more characteristics of the subject. Additionally, the system for crowd-sourced monitoring system determines the likelihood that a dangerous incident could occur (a "threat level") based on the danger index of the subjects, and takes an action if the threat level exceeds a predetermined threshold.

In some embodiments, the monitoring devices are configured to communicate with one or more servers. The monitoring devices may be configured to identify subjects and determine a danger index. The monitoring devices may also be configured to calculate a threat level. The monitoring devices may also be configured to take an action after the threat level has exceeded a predetermined threshold. The electronic monitoring and protection system may also be configured to cause a server or user device to take an action after the threat level has exceeded a predetermined threshold.

In some embodiments, the electronic monitoring and protection system obtains information indicating at least one person to be protected. The electronic monitoring and protection system may use security data to identify and locate a person to be protected. The security data may include location data corresponding to the monitoring device. The electronic monitoring and protection system may initiate an action when the electronic monitoring and protection system cannot locate a person to be protected. The electronic monitoring and protection system may determine the geographic location of a person to be protected. The electronic monitoring and protection system may use the security data to determine whether a person to be protected is expected to travel to a geographic location. The electronic monitoring and protection system may determine whether the person to be protected is expected to travel to a geographic location based on a conversation detected in the security data.

In some embodiments, the electronic monitoring and protection system may determine an expected time for a person to be protected to arrive at the geographic location. The electronic monitoring and protection system may determine whether a person to be protected arrives at the geographic location at the expected time. The electronic monitoring and protection system may take an action based on the determination that a person to be protected has arrived at the geographic location at the expected time. The electronic monitoring and protection system may take an action based on the determination that a person to be protected has not arrived at the geographic location at the expected time. The electronic monitoring and protection system may transmit a confirmation that a person to be protected has arrived at the geographic location. The electronic monitoring and protection system may transmit a confirmation that a person to be protected has not arrived at the geographic location.

In some embodiments, the electronic monitoring and protection system uses the security data to create a map of the electronic monitoring and protection system's coverage area. The electronic monitoring and protection system may identify the coverage area by using the security data to identify geographic locations, such as by identifying points of interest, using location data present in the security data, identifying ambient noise, etc. The electronic monitoring and protection system may classify certain portions of the coverage area based on the type of security data (e.g. audio, video, etc.) used to identify the portion of the coverage area. The electronic monitoring and protection system may use the map of the coverage area to identify "gaps" in the coverage area by identifying which geographic locations cannot be identified by the security data. The electronic monitoring and protection system may further classify the gaps in the coverage area based on the type of security data used to identify and monitor the coverage area (e.g. a gap identified as a "video gap" may be an area for which video data is not collected but audio data is collected). The electronic monitoring and protection system may dispatch a drone to follow a person to be protected when the electronic monitoring and protection system determines the person to be protected has entered a gap in the coverage area.

In some embodiments, the one or more of the characteristics of a subject used to determine a danger index are based on the subject's interactions with other subjects having an assigned danger index. The one or more of the characteristics of a subject used to determine a danger index may be based on the subject's criminal record. The subject identified by the electronic monitoring and protection system may be an animal. A subject may have an assigned danger index, such as when the subject is an animal.

In some embodiments, the action taken by the electronic monitoring and protection system includes transmitting a message to a user device. The action taken by the electronic monitoring and protection system may include transmitting security data received from a monitoring device to a user device.

In some embodiments, the action taken by the electronic monitoring and protection system may include dispatching a drone to a geographic location associated with the person to be protected. The electronic monitoring and protection system may dispatch a drone when the threat level to a person to be protected exceeds a predetermined threshold. The action taken by the electronic monitoring and protection system may include dispatching a drone to a geographic location associated with one or more subjects. The geographic location may be the location of an interaction between the person to be protected and one or more subjects. The electronic monitoring and protection system may cause a dispatched drone to emit a noise. The electronic monitoring and protection system may cause a dispatched drone to emit a noise after the threat level has exceeded a predetermined threshold.

In some embodiments, when the electronic monitoring and protection system can no longer detect a person to be protected the electronic monitoring and protection system may identify the last known geographic location of the person to be protected. The electronic monitoring and protection system may dispatch a drone to the last known geographic location of a person to be protected. The electronic monitoring and protection system may instruct the drone to follow the person to be protected. The drone may be configured to defend a person to be protected with an implement attached to the drone.

In some embodiments, the drone may be configured to obtain additional security data from a monitoring device attached to the drone. The electronic monitoring and protection system may modify the threat level based on the security data obtained by the drone. The drone may be configured to interact with one or more objects at a geographic location associated with one or more subjects and a person to be protected.

In some embodiments, the action taken by the electronic monitoring and protection system may include transmitting a message to at least one user device. The action taken by the electronic monitoring and protection system may include transmitting real-time security data to at least one user device. The electronic monitoring and protection system may transmit a message including information describing how to prevent a future interaction from reaching a determined threat level to the one or more subjects and one or more persons to be protected.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a diagram depicting an example electronic monitoring and protection system 100 and an example monitored area 105 in which an electronic monitoring and protection system may be implemented. It is to be appreciated that FIG. 1 illustrates just one example of a monitored area 105 and that the various embodiments discussed herein are not limited to the use of such an environment. The example monitored area 105 includes a server 101, one or more monitoring devices 102a-102c, one or more drones 103, and one or more user devices 104a and 104b. The monitored area 105 may include a variety of monitoring devices 102a-102c, user devices 104a and 104b, and drones 103, which may be communicatively coupled to one or more servers 101 and/or to each other.

The monitored area may also include an optional network, communication system, or networked system (not shown), to which the server 101, monitoring devices 102, drone(s) 103, and/or user devices 104a and 104b (collectively referred to as endpoint devices) may be coupled. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access ("WiMax") devices, or the like, may be communicatively coupled to the network and/or to each other so that the plurality of endpoint devices are communicatively coupled together. Thus, such a network enables the interconnected endpoint devices, the server 101, monitoring devices 102a-102c, drone(s) 103, and user devices 104a and 104b, to communicate with each other.

The monitoring devices 102a-102c may include devices such as cellular telephones, smartphones, tablets, personal computers, laptop computers, security cameras, Internet of Things (or "smart") devices, user devices, digital assistants, personal assistant devices—such as Amazon Alexa, Google Home, etc., —drones, etc. The monitoring devices 102a-102c may interconnect to one or more communications media or sources, such as routers, network switches, modems, etc., to transmit communications to other devices. In some embodiments, the user devices 104a and 104b may control the monitoring devices 102a-102c. The monitoring devices 102a and 102b may transmit security data to the user devices 104a and 104b. The monitoring devices 102a and 102b may transmit security data to the drone(s) 103. The monitoring devices 102a and 102b may transmit security data to the server 101. Security data may include, but is not limited to, data regarding: audio data captured from an environment, subject, person to be protected, user, etc.; video data captured from an environment, subject, person to be protected, user, etc.; and/or location data representing a geographic location.

The drone(s) 103 may include any remote-controlled or autonomous vehicle, such as a remote-controlled car, roadsafe vehicle such as a car, truck, SUV, ATV, etc., quadcopter, remote-controlled boat, remote-controlled plane, etc. The drone(s) 103 may interconnect to one or more communications media or sources such as routers, network switches, modems, etc., to transmit communications to other devices. In some embodiments, one or more of the user devices 104a and 104b and/or monitoring devices 102a-102c control the drone(s) 103. The drone(s) 103 may transmit security data to the user devices 104a and 104b. The drone(s) 103 may transmit security data to the server 101.

The user devices 104a and 104b may include devices such as personal assistant devices, personal computers, laptop computers, smartphones, cellular telephones, tablets, etc. The user devices 104a and 104b may interconnect to one or more communications media or sources, such as routers, network switches, modems, etc., to transmit communications to other devices. The user devices 104a and 104b may transmit data including instructions to operate one or more of the monitoring devices 102a-102c. The user devices may 104 transmit data including instructions to operate a drone(s) 103. In some embodiments, the user devices 104a and 104b receive security data from the server 101. In some embodiments, the user devices 104a and 104b receive security data from one or more of the monitoring devices 102a-102c. In some embodiments, the user devices 104a and 104b receive security data from a drone(s) 103. The user devices 104a and 104b may transmit security data to the server 101. In some embodiments, the server 101 transmits informational pamphlets regarding the reduction of threats to user devices 104a and 104b.

The above description of the monitored area 105, and the various devices therein, is intended as a broad, non-limiting overview of an example environment in which various embodiments of a system to guarantee advertisement impressions may be implemented. The monitored area 105 and the various devices therein, may contain other devices, systems and/or media not specifically described herein.

Example embodiments described herein provide applications, tools, data structures and other support to implement systems and methods for providing crowd-sourced monitoring of an area. The example embodiments described herein additionally provide applications, tools, data structures and other support to implement systems and methods for providing crowd-sourced monitoring of an area and taking actions to protect designated persons within the area. Other embodiments of the described techniques may be used for other purposes, including for monitoring an area generally. In the following description, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
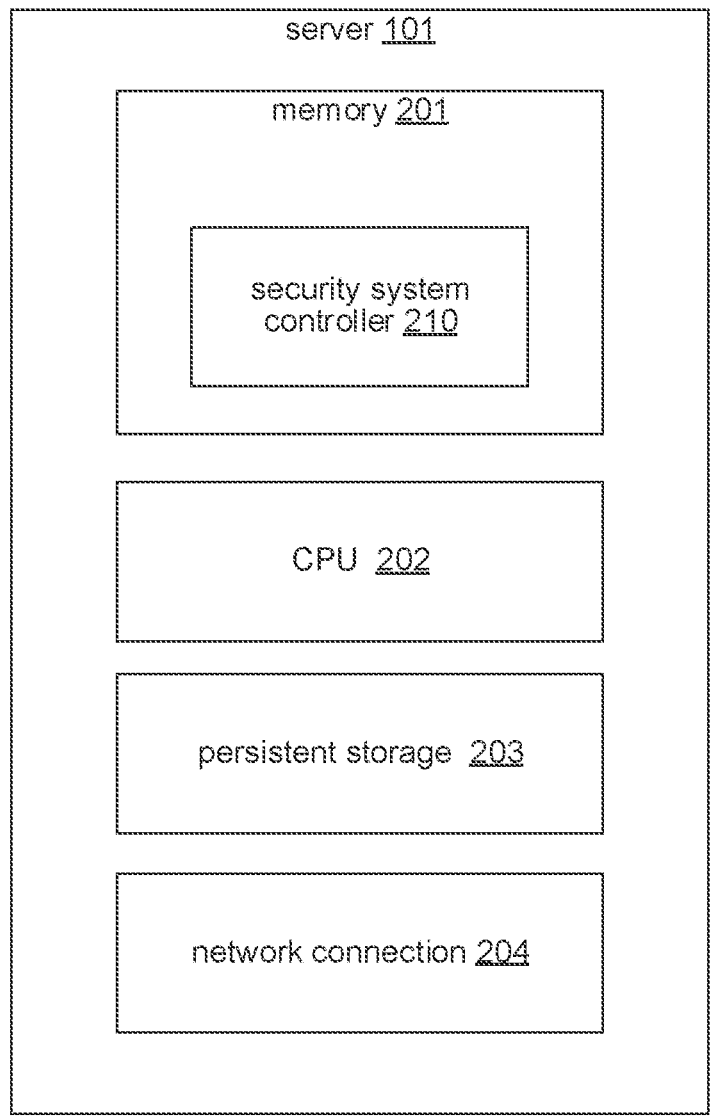
FIG. 2 is a block diagram depicting example components incorporated in a server on which the electronic monitoring and protection system may operate, according to various embodiments described herein.

FIG. 2 is a block diagram depicting example components incorporated in a server 101 on which the electronic monitoring and protection system 100 may operate, according to various embodiments described herein. In various embodiments, the server 101 includes one or more of the following: a computer memory 201 for storing programs and data while they are being used, including data associated with the electronic monitoring and protection system 100, an operating system including a kernel, and device drivers; a central processing unit ("CPU") 202 for executing computer programs; a persistent storage device 203, such as a hard drive or flash drive for persistently storing programs and data; and a network connection 204 for connecting to one or more user devices, such as user devices 104a and 104b, drones, such as drone(s) 103, monitoring devices 102a-102c, and/or other computer systems to send and/or receive data, such as via the Internet or another network and associated networking hardware, such as switches, routers, repeaters, electrical cables and optical fibers, light emitters and receivers, radio transmitters and receivers, and the like. While a monitoring devices 102a-102c configured as described above is typically used to support the operation of the electronic monitoring and protection system 100, those skilled in the art will appreciate that the electronic monitoring and protection system 100 may be implemented using devices of various types and configurations, and having various components. The memory 201 may include a security system controller 210 which contains computer-executable instructions that, when executed by the CPU 202, cause the server 101, monitoring devices 102a-102c, drone(s) 103, and/or user devices 104a and 104b, to perform the operations and functions described herein. For example, the programs referenced above, which may be stored in computer memory 201, may include or be comprised of such computer-executable instructions.

The security system controller 210 performs the core functions of the server 101, as discussed herein and also with respect to FIGS. 5 through 8. In particular, the system device controller 210 obtains security data from the monitoring devices 102a-102c, drone(s) 103, or user devices 104a and 104b and transmits the security data to other devices, such as a server 101, drone(s) 103, user devices 104a and 104b, or various other devices. The security system controller 210 may additionally include instructions to receive an indication from a user to share security data from the monitoring devices 102a-102c, drone(s) 103, or user devices 104a and 104b with the server 101. The security system controller 210 may additionally contain computer-executable instructions to cause the monitoring device to perform some or all of the operations further described in FIGS. 5-8. The security system controller 210 may also receive signals including instructions for operation of the monitoring devices 102a-102c from one or more of the server 101, drone(s) 103, user devices 104a and 104b, or other various devices. The security system controller 210 may also include computer-executable instructions for controlling and operating the monitoring devices 102a-102c, drone(s) 103, or other various devices. The security system controller 210 may also include computer-executable instructions for receiving input from the user devices 104a and 104b, and using that input to control and operate the monitoring devices 102a-102c, drone(s) 103, or other various devices.

In an example embodiment, the security system controller 210 and/or computer-executable instructions stored on memory 201 of the server 101 are implemented using standard programming techniques. For example, the security system controller 210 and/or computer-executable instructions stored on memory 201 of the server 101 may be implemented as a "native" executable running on CPU 202, along with one or more static or dynamic libraries. In other embodiments, the security system controller 210 and/or computer-executable instructions stored on memory 201 of the server 101 may be implemented as instructions processed by a virtual machine that executes as some other program.

Figure 3:
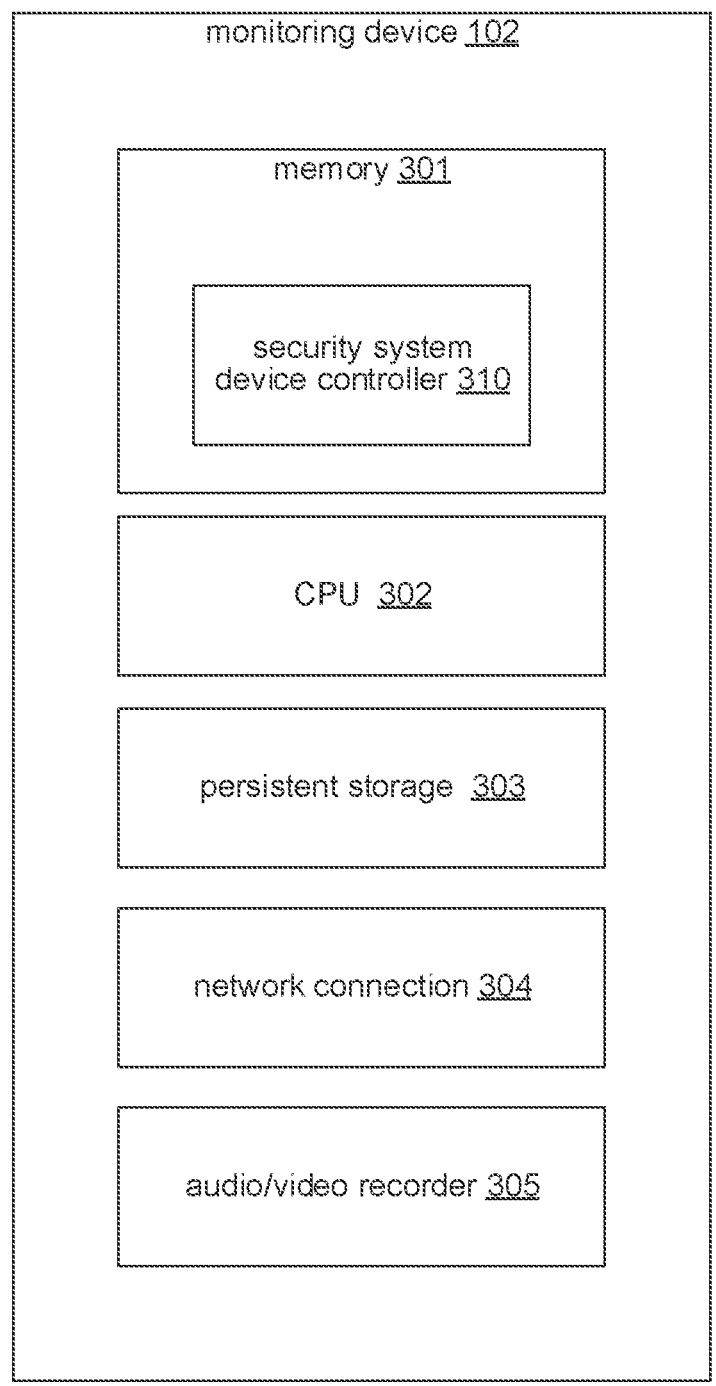
FIG. 3 is a block diagram depicting example components incorporated in a monitoring device which may be included in the electronic monitoring and protection system or on which the electronic monitoring and protection system may operate, according to various embodiments described herein.

FIG. 3 is a block diagram depicting example components incorporated in a monitoring devices 102a-102c which may be included in the electronic monitoring and protection system 100, or on which the electronic monitoring and protection system 100 may operate, according to various embodiments described herein. In various embodiments, the monitoring devices 102a-102c includes one or more of the following: a computer memory 301 for storing programs and data while they are being used, including the data associated with the electronic monitoring and protection system 100, an operating system including a kernel, and device drivers; a central processing unit ("CPU") 302 for executing computer programs; a persistent storage device 303, such as a hard drive or flash drive for persistently storing programs and data; a network connection 304 for connecting the monitoring device to user devices, such as user devices 104a and 104b, drones, such as drone(s) 103, other monitoring devices, and/or other computer systems to send and/or receive data, such as via the Internet or another network and associated networking hardware, such as switches, routers, repeaters, electrical cables and optical fibers, light emitters and receivers, radio transmitters and receivers, and the like; and an audio/video recorder 305, comprising a microphone, camera, or any other recording device used to capture audio, video, or other data usable to describe an environment and the subjects within the environment. While monitoring devices 102a-102c configured as described above are typically used to support the operation of the electronic monitoring and protection system 100, those skilled in the art will appreciate that the electronic monitoring and protection system 100 may be implemented using devices of various types and configurations, and having various components. The memory 301 may include a security system device controller 310 which contains computer-executable instructions that, when executed by the CPU 302, cause the monitoring devices 102a-102c, drone(s) 103, and/or user devices 104a and 104b, to perform the operations and functions described herein.

The security system device controller 310 performs the core functions of the monitoring devices 102a-102c, as discussed herein and also with respect to FIGS. 5 through 8. In particular, the system device controller 310 obtains security data from the audio/video recorder 305 on the monitoring devices 102a-102c and transmits the security data to other devices, such as a server 101, drone(s) 103, user devices 104a and 104b, or various other devices. The security system device controller 310 may additionally include instructions to receive an indication from a user to share security data with a server 101, drone(s) 103, or user devices 104a and 104b. The security system device controller 310 may additionally contain computer-executable instructions to cause the monitoring device to perform some or all of the operations further described in FIGS. 5-8. The security system device controller 310 may also receive signals including instructions for operation of the monitoring devices 102a-102c from one or more of the server 101, drone(s) 103, user devices 104a and 104b, or other various devices.

In an example embodiment, the security system device controller 310 and/or computer-executable instructions stored on memory 301 of the monitoring devices 102a-102c are implemented using standard programming techniques. For example, the security system device controller 310 and/or computer-executable instructions stored on memory 301 of the monitoring devices 102a-102c may be implemented as a "native" executable running on CPU 302, along with one or more static or dynamic libraries. In other embodiments, the security system device controller 310 and/or computer-executable instructions stored on memory 301 of the monitoring devices 102a-102c may be implemented as instructions processed by a virtual machine that executes as some other program.

Figure 4:
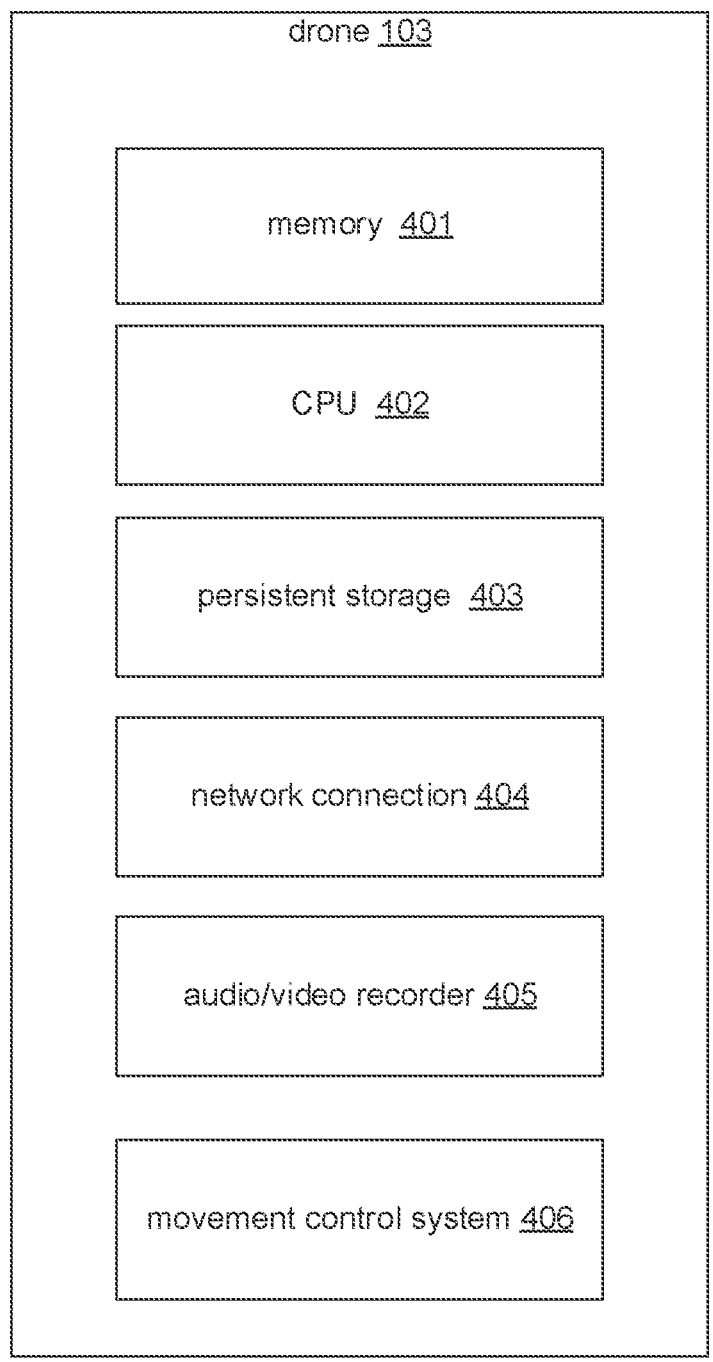
FIG. 4 is a block diagram depicting example components incorporated in a drone which may be included in the electronic monitoring and protection system or on which the electronic monitoring and protection system may operate, according to various embodiments described herein.

FIG. 4 is a block diagram depicting example components incorporated in a drone(s) 103 which may be included in the electronic monitoring and protection system 100, or on which the electronic monitoring and protection system 100 may operate, according to various embodiments described herein. In various embodiments, the drone(s) 103 includes one or more of the following: a computer memory 401 for storing programs and data while they are being used, including the data associated with the electronic monitoring and protection system 100, an operating system including a kernel, and device drivers; a central processing unit ("CPU") 402 for executing computer programs; a persistent storage device 403, such as a hard drive or flash drive for persistently storing programs and data; a network connection 404 for connecting the monitoring device to user devices 104a and 104b, drones 103, monitoring devices 102a-102c, servers 101, and/or other computer systems to send and/or receive data, such as via the Internet or another network and associated networking hardware, such as switches, routers, repeaters, electrical cables and optical fibers, light emitters and receivers, radio transmitters and receivers, and the like; an audio/video recorder 405, comprising a microphone, camera, or any other recording device used to capture audio, video, or other data usable to describe an environment and the subjects within the environment; and a movement control system 406 configured to operate the motion controls of the drone, such as rotors, wheels, motors, engines, etc. In some embodiments, the drone(s) 103 further includes a global navigation system used to locate the drone and assist in the drone's movement, such as a GPS system. In some embodiments, the drone(s) 103 further includes an environmental interaction implement, such as a prod, stun gun, firearm, sound system, claw, arm, flare, etc. While a drone(s) 103 configured as described above is typically used to support the operation of the electronic monitoring and protection system 100, those skilled in the art will appreciate that the electronic monitoring and protection system 100 may be implemented using drones of various types and configurations, and having various components.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the drone(s) 103.

In addition, programming interfaces to the data stored as part of the security system device controller 310 and/or security system controller 210, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The security system device controller 310 and/or security system controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the server 101, monitoring devices 102a-102c, drone(s) 103, and/or user devices 104a and 104b.

Furthermore, in some embodiments, some or all of the components/portions of the security system device controller 310 and/or functionality provided by the computer-executable instructions stored on memory 201 of the monitoring devices 102a-102c may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the monitoring devices, user devices, drones, servers, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 5 is a table diagram showing sample contents of a danger index table used by the electronic monitoring and protection system 100 according to various embodiments described herein. For example, the danger index table may be, include, or comprise a data structure and associated data stored in, or accessible by, the server 101, one or more monitoring devices 102a-102c, one or more user devices 104a and 104b, and/or one or more drone(s) 103. In some embodiments, the information represented in the danger index table may be stored in various different types of data structures and/or in a neural network implemented or accessible by the server 101, one or more monitoring devices 102a-102c, one or more user devices 104a and 104b, and/or one or more drone(s) 103. The danger index table contains rows, such as rows 501-503, each corresponding to a different subject. Each row is divided into the following columns: a subject column 510, a criminal record column 511, a dangerous interactions column 512, a curse word frequency column 513, a group affiliations column 514, and a danger index column 515.

The subject column 510 stores a unique identifier used to distinguish one subject from other subjects. In some embodiments, the electronic monitoring and protection system 100 utilizes security data to identify subjects through biometric identifiers, such as facial recognition, voice recognition, etc.; demographic information, such as address, name, etc.; device ownership; etc. The electronic monitoring and protection system 100 may automatically add a subject to the danger index table when a new subject is identified. In some embodiments, users of the electronic monitoring and protection system 100 identify subjects to be added to the danger index table. In some embodiments, the subject identified is an animal.

The criminal record column 511 includes information indicating the subject's criminal record. In some embodiments, the electronic monitoring and protection system 100 obtains information indicating the subject's criminal record from a data source such as a database including information describing criminals, their crimes, and their affiliations. The server, user device, and/or monitoring device may obtain the information indicating the subject's criminal record. The data source from which the subject's criminal record is obtained may include police databases, public court databases, sex-offender notification databases, automated Internet searches or web crawlers, RSS feeds, other sources of information, etc. In some embodiments, the electronic monitoring and protection system 100 obtains information indicating the subject's criminal record from user input. The dangerous interactions column 512 includes information indicating the number of dangerous interactions the subject has been involved in. In some embodiments, the electronic monitoring and protection system 100 obtains information indicating the number of dangerous interactions the subject has been involved in by utilizing the security data to identify whether the subject was present in dangerous situations. The security data may be used to identify the subject and whether the subject was present in dangerous situations by utilizing computer vision techniques, object recognition, voice recognition, face recognition, etc. In some embodiments, the electronic monitoring and protection system 100 obtains information indicating whether the subject was present in dangerous situations from user input.

The curse word frequency column 513 includes information indicating the frequency at which the subject uses curse words. In some embodiments, the electronic monitoring and protection system 100 determines the frequency at which the subject uses curse words based on the security data. The server, user device, monitoring device, etc., may determine the frequency of a subject's use of curse words by using speech recognition and natural language processing techniques on voices captured by microphones of the user and/or monitoring devices to detect curse words. The group affiliations column 514 includes data indicating the groups or types of groups that the subject is affiliated with. In some embodiments, the electronic monitoring and protection system 100 identifies whether a subject is affiliated with a certain group based on determining which other subjects the subject has interacted with. In some embodiments, the electronic monitoring and protection system 100 identifies whether a subject is affiliated with a certain group based on user input. In some embodiments, the electronic monitoring and protection system 100 identifies whether a subject is affiliated with certain groups by obtaining information indicating that the subject is affiliated with a group from a data source such as a database including information describing criminals, their crimes, and their affiliations. The server, user device, and/or monitoring device may obtain the information indicating the subject's group affiliations. The data source from which the subject's group affiliations and/or other information regarding the subject used to determine a danger index of the subject is obtained may include police databases, public court databases, sex-offender notification databases, automated Internet searches or web crawlers, RSS feeds, other sources of information, etc.

The danger index column 515 includes information indicating the danger index of the subject. In some embodiments, the danger index of the subject is determined based on the information contained in the danger index table. In some embodiments, the danger index table includes additional information, or "characteristics," describing each subject on which the danger index may be based, such as: familial relationships; driving record; driving style; interactions with people of similar or different demographics, such as gender, age, religion, culture, sexuality, etc.; interactions with people belonging to other groups, such as political groups, religious groups, sports groups, etc.; interactions with children; schedule or patterns of schedule; biometric measurements during interactions; interactions with animals; interactions with objects within the area; maintenance of property; frequency of mail or packages; frequency of visits to a place of worship; shopping patterns; political affiliations; ownership of guns, explosives or other dangerous instruments; speech patterns; etc. In some embodiments, certain animals, such as coyotes, bobcats, mountain lions, snakes, alligators, crocodiles, sharks, moose, etc., have higher danger index by default. The electronic monitoring and protection system 100 may update a subject's danger index as the electronic monitoring and protection system 100 receives new information.

In various embodiments, which characteristics are used in the determination of the danger index and what weight is given to each characteristic used in the determination of the danger index by the system are customizable and selectable by a user of the system. For example, rows 501-503 each contain sample data depicting how each of the characteristics may affect the determination of a subject's danger index. Row 501 indicates that subject 1111 has a guilty pela for speeding, one dangerous interaction, uses one curse word for every twenty words, and is affiliated with the Autocross Club of America and the St. Peter and Paul Church Volunteers. Thus, based on user selections by the user of which characteristics are used in determination of the danger index and what weight is given to each characteristic used in the determination of the danger index by the system, the system determines subject 1111 has a danger index of four, as indicated in row 501. Row 502 indicates that subject 2222 with multiple convictions, seven dangerous interactions, frequent cursing, and group affiliations selected by the user as dangerous has a danger index of ten.

Figure 6:
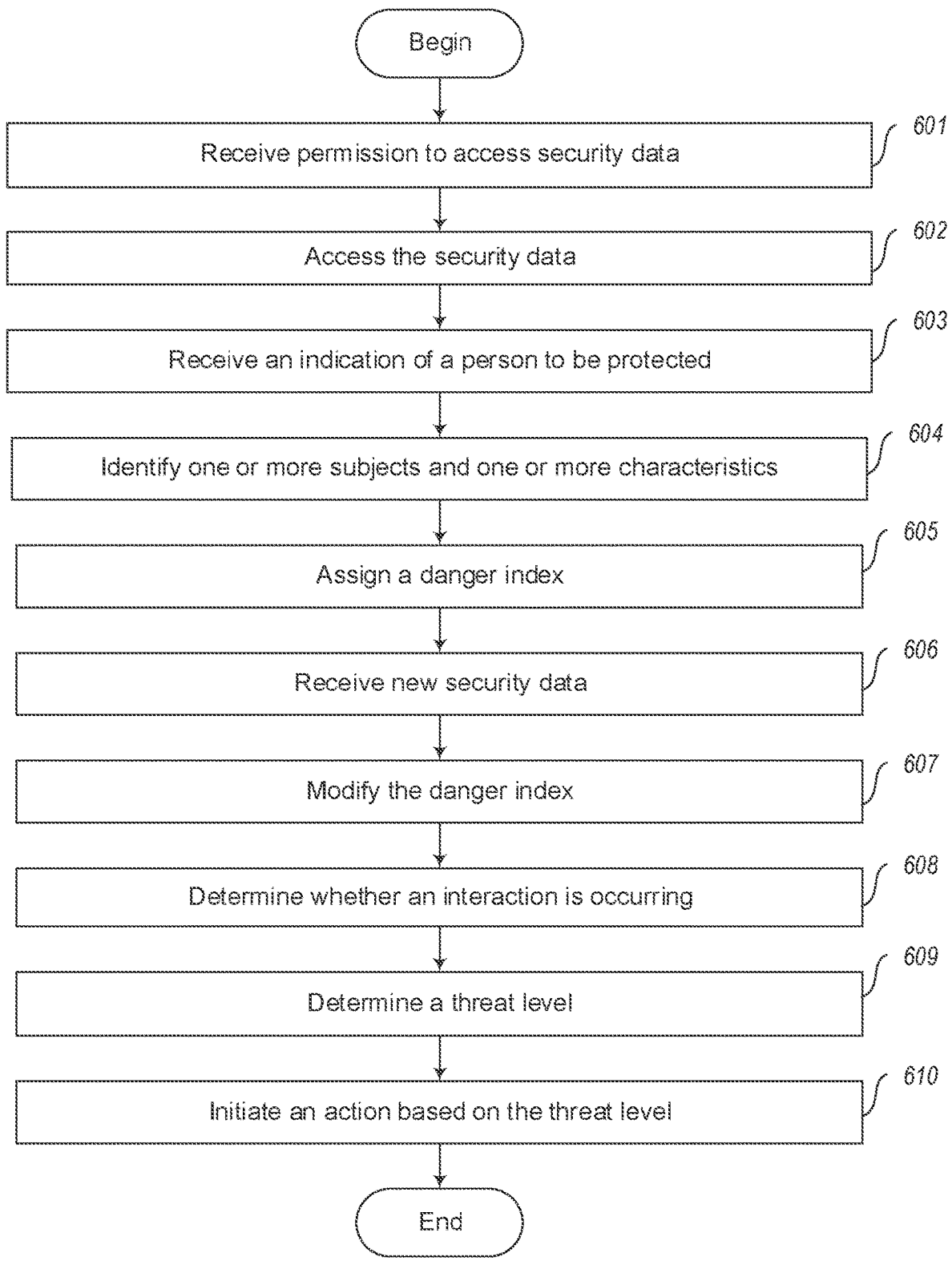
FIG. 6 is a flow diagram depicting a process to initiate an action based on a determined threat level in an electronic monitoring and protection system, according to various embodiments described herein.

FIG. 6 is a flow diagram depicting a process to initiate an action based on a determined threat level in an electronic monitoring and protection system 100, according to various embodiments described herein. At act 601, the electronic monitoring and protection system 100 receives permission to access security data from one or more monitoring devices. In some embodiments, one or more users grant permission to the electronic monitoring and protection system 100 to access security data from the one or more monitoring devices and/or control the monitoring devices. For example, the server 101, user device 104a, and/or user device 104b may prompt a user with a request for access and/or permission to use security data obtained from one or more of the monitoring devices 102a-102c associated with the user and/or control one or more of the monitoring devices 102a-102c associated with the user. In some embodiments, the server 101 may maintain a database of authorized users and associated permissions granted by each to the protection system 100. For example, some users may provide permission to access and/or control particular monitoring devices, such as home security cameras or smart speakers, and deny access to other associated monitoring devices, such as cellular telephones and mobile devices. Also, the user may grant permission to access certain types of security data (e.g., audio data), while denying access to other types of security data (e.g., video data). The amount, type, or level of services provided to a user by the electronic monitoring and protection system 100 may be proportional, associated with or otherwise based on the amount, level, or type of access granted by the user to the electronic monitoring and protection system 100 to access and/or control monitoring devices of the user. The electronic monitoring and protection system 100 described herein may make participation in and electronic access to the electronic monitoring and protection services and/or information provided thereby to a user conditional upon the user granting access to the electronic monitoring and protection system 100 to monitoring devices of the user, or the otherwise "opting in". After the user has granted access to the security data from the one or more monitoring device 102a-102c, the server 101, user device 104a, and/or user device 104b may obtain security data from the monitoring devices 102a-102c. At act 602, the electronic monitoring and protection system 100 accesses the security data from the one or more monitoring devices. At act 603, the electronic monitoring and protection system 100 receives an indication of a person to be protected. In some embodiments, the user indicates who the person to be protected is through user input.

At act 604, the electronic monitoring and protection system 100 identifies one or more subjects and one or more characteristics of the one or more subjects. The electronic monitoring and protection system 100 may identify the one or more subjects and obtains one or more characteristics of the one or more subjects by utilizing one or more of: facial recognition techniques, biometric identifiers, identifying known traits or identifying marks, obtaining data related to the subject from a database of subject characteristics, identifying changes in a subject's voice, etc. The one or more subjects may be identified by utilizing computer vision, object recognition techniques, and/or voice recognition techniques to distinguish individual subjects and compare the distinguished subjects to previous data samples, such as videos, photos, voice and speech patterns, etc., attributed to the subject. The one or more subjects may also be identified by collecting biometric data from the security data, such as through iris recognition, voice recognition, facial structure, analysis of gait, or other biometric data, and comparing that biometric data with previous biometric data samples attributed to the subject. The one or more characteristics may be identified by utilizing computer vision, object recognition techniques, and/or voice recognition techniques to obtain characteristics related to the subject's actions, appearance, etc. The one or more characteristics may also be identified by attributing previously known characteristics already associated with the subject after the subject has been identified, such as the characteristics in the danger index table.

At act 605, the electronic monitoring and protection system 100 assigns a danger index to the one or more subjects. In some embodiments, the electronic monitoring and protection system 100 utilizes an artificial neural network, machine learning and/or other artificial intelligence components of the system to assign the danger index. The artificial neural network may be trained to assign a danger index based on characteristics of the subject. The artificial neural network may be trained by using a dataset including characteristics of people, and/or animals, who have harmed others and characteristics of people, and/or animals, who have not harmed others. The artificial neural network may be retrained as the electronic monitoring and protection system 100 obtains additional security data and additional data indicating subjects and their characteristics. In some embodiments, the danger index is weighted based on historic indicators, thereby enabling a subject to lower or raise their danger index based on the amount of time since participating in dangerous activities.

At act 606, the electronic monitoring and protection system 100 receives new security data from the monitoring devices in real time as security data is obtained by the monitoring device. The new security data may be obtained from multiple monitoring devices, user devices, etc., belonging to a variety of home security systems. The new security data may be used to track a subject as they move throughout the monitored area, by identifying which devices transmit security data indicating the subject. For example, a subject walking along a street would eventually not be detected by a monitoring device located at the beginning of the street, but may be detected by subsequent monitoring devices located at various locations throughout the street. The new security data may also be a part of a continuous stream of security data, which is used to track the subject's movements as they occur in "real time." For example, once the electronic monitoring and protection system 100 determines an identified subject is no longer being detected by one monitoring device, the electronic monitoring and protection system 100 (e.g., the server 101) may automatically search live video and/or audio feeds of other monitoring devices of other users who have opted in to participate in the electronic monitoring and protection system 100 to determine the current location and activities of the subject and adjust the danger index and/or threat level accordingly. The electronic monitoring and protection system 100 may obtain new security data in real time, e.g., as the monitoring devices receive the security data, and transmit the new security data to the server to identify a subject, and the subject's characteristics, as soon as the new security data is received by the server 101. The electronic monitoring and protection system 100 may use the new security data to track the person to be protected. The electronic monitoring and protection system 100 may detect whether a person to be protected, or a subject, has entered a gap in the coverage area based on the new security data being used to track the person to be protected or the subject. At act 607, the electronic monitoring and protection system 100 updates the danger index of the one or more subjects in a similar manner to acts 604 and 605.

At act 608, the electronic monitoring and protection system 100 determines whether an interaction is occurring based on the security data and the new security data. In some embodiments, the electronic monitoring and protection system 100 performs natural language processing on the security data and the new security data to determine whether the one or more subjects are interacting with each other. The electronic monitoring and protection system 100 may utilize natural language processing to determine what topic the one or more subjects are discussing. In some embodiments, the electronic monitoring and protection system 100 utilizes an artificial neural network trained based on a dataset including security data depicting a variety of interactions, such as fights, drug deals, playing, joking, arguments, etc., between subjects to determine the type of interaction occurring between the one or more subjects and the person to be protected. In some embodiments, where at least one of the one or more subjects possesses a user device connected to the electronic monitoring and protection system 100, the electronic monitoring and protection system 100 obtains additional security data from the user device when the interaction is occurring.

At act 609, the electronic monitoring and protection system 100 determines a threat level for the interaction. In some embodiments, the threat level is determined based on the danger index of the one or more subjects and the interaction occurring between the one or more subjects and the person to be protected. The threat level may be determined through a function, formula, the relationship between the characteristics or danger index of a subject and the person to be protected, etc., that indicate an interaction between a subject and a person to be protected and/or between a subject and another subject, for example: a conversation occurring; the physical proximity of the subject(s) and/or the person to be protected; physical contact between the subject(s) and/or the person the person to be protected; etc. The location of the interaction may also be a factor in raising or lowering the threat level, such as an interaction occurring: at a subject's home; at a home of the person to be protected; at an area the person to be protected is authorized to be in (such as, in the case of a child, a playground, park, school, etc.); at an area the person to be protected is not authorized to be in (such as, in the case of a child, a construction site, an abandoned building, a certain part of the neighborhood known for dangerous interactions, etc.); etc. The location of the interaction may be determined by obtaining location data from the monitoring devices in the area and/or the user devices associated with the subject(s) and/or the person to be protected. In some embodiments, the threat level is determined by using an artificial neural network or other artificial intelligence system trained by using a dataset including a variety of interactions and a variety of danger indexes to determine a threat level. The threat level may increase if the person to be protected cannot be located by the electronic monitoring and protection system 100.

At act 610, the electronic monitoring and protection system 100 initiates an action based on the threat level determined in act 609. In some embodiments, as the threat level rises, the electronic monitoring and protection system 100 takes additional actions. The action may include a message sent by the electronic monitoring and protection system 100 to a user device of the one or more subjects and the person to be protected. The message may include an option to provide user feedback regarding whether the determination of the threat level is accurate. In some embodiments, the electronic monitoring and protection system 100 uses the user feedback to improve the determination of future threat levels, such as by using such feedback in the training of the artificial neural network or other artificial intelligence components of the system to accurately determine threat levels in various circumstances and scenarios.

In some embodiments, the action includes dispatching a drone to a geographic location associated with the one or more subjects and the person to be protected. The drone may obtain additional security data after it is dispatched. In some embodiments, the drone follows the person to be protected to a safe location, by utilizing location data retrieved from a user device in the possession of the person to be protected, identifying and tracking in real time the image of the person to be protected based on security data obtained by the drone and/or other monitoring devices, etc. In some embodiments, a user device receives a message if the threat level exceeds a predetermined level. The security data may be transmitted to the user device, such that the user device may present the security data to a user. In some embodiments, the user device may be used to control the drone. In some embodiments, if the user device has not been activated within a predetermined time period after receiving a message, the electronic monitoring and protection system 100 transmits the message to a designated trusted user device. The action may include notifying specific people or groups, such as neighborhood watch volunteers, emergency services, emergency contacts, etc. In some embodiments, an autonomous vehicle is dispatched to the geographic location associated with the one or more subjects and the person to be protected to transport the person to be protected to a safe area.

The action may include transmitting educational materials detailing how to prevent a dangerous interaction to at least one of the one or more subjects and/or the protected person. The action may include transmitting a message including a danger index score assigned the user. In some embodiments, the message including the danger index score provides suggestions for lowering the subject's danger index. In some embodiments, a user will not be permitted to view their danger index if their danger index reaches a predetermined level, such as to avoid the user from circumventing the security system.

In some embodiments, the electronic monitoring and protection system 100 utilizes natural language processing to determine if the person to be protected is expected to travel to a geographic location. The electronic monitoring and protection system 100 may determine an expected time for the person to be protected to travel to a geographic location. The electronic monitoring and protection system 100 may determine whether the person to be protected has reached the geographic location by the expected time by utilizing security data retrieved from the monitoring devices. The electronic monitoring and protection system 100 may initiate an action when the person to be protected has not arrived at the geographic location by the expected time. The electronic monitoring and protection system 100 may initiate an action when the person to be protected has arrived at the geographic location by the expected time. The action initiated may include transmitting a confirmation that the person to be protected has or has not arrived at the geographic location to a user device.

Figure 7:
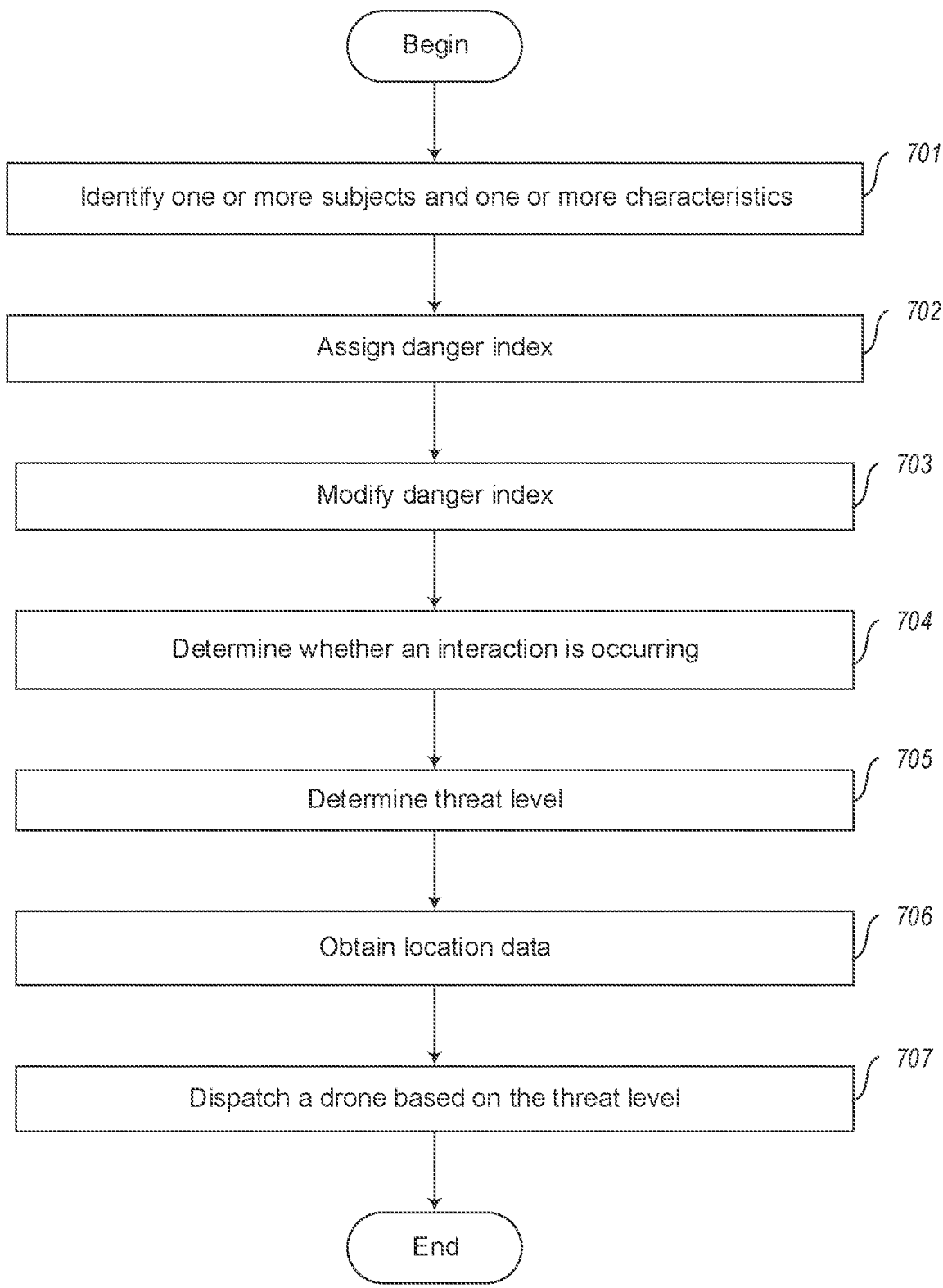
FIG. 7 is a flow diagram depicting a process in an electronic monitoring and protection system to dispatch a drone while monitoring an area, according to various embodiments described herein.

FIG. 7 is a flow diagram depicting a process in an electronic monitoring and protection system 100 to dispatch a drone while monitoring an area, according to various embodiments described herein. At act 701, the electronic monitoring and protection system 100 identifies one or more subjects and one or more characteristics of the subjects in a similar manner to act 604. At act 702, the electronic monitoring and protection system 100 assigns a danger index to each of the one or more subjects in a similar manner to act 605. At act 703, the electronic monitoring and protection system 100 modifies the danger index based on new security data in a manner similar to act 607. At act 704, the electronic monitoring and protection system 100 determines whether an interaction is occurring between the one or more subjects and the person to be protected based on the security data and the new security data in a manner similar to act 608. At act 705, the electronic monitoring and protection system 100 determines the threat level to a person to be protected in a manner to act 609.

At act 706, the electronic monitoring and protection system 100 obtains location data from the security data and the new security data to determine a geographic location associated with the one or more subjects or the person to be protected. The location data may be obtained via video of the person to be protected and/or subject collected by a monitoring device in real time, detecting objects in video data identifying a geographic location, detecting location names or clues in audio data, obtaining location data from a device possessed by the subject and/or person to be protected, etc. In some embodiments, each monitoring device includes location data as part of the security data and the electronic monitoring and protection system 100 infers the location of the person to be protected, the one or more subjects, or the interaction based on the location data included as part of the security data. In some embodiments, the location data is obtained from a user device associated with the person to be protected or the one or more subjects. The location data may be obtained via the GPS system of the user device, cellular triangulation, etc.

At act 707, the electronic monitoring and protection system 100 dispatches a drone to the location when the threat level has exceeded a predetermined threshold. In some embodiments, the drone is configured to emit a noise, siren, recorded message, etc., when the threat level exceeds a certain threshold. In some embodiments, when the electronic monitoring and protection system 100 can no longer detect the person to be protected within the monitored area a drone is dispatched to the last known location of the person to be protected. In some embodiments, when the person to be protected enters, or is close to entering, a gap in the coverage area, the drone is dispatched to the location of the person to be protected and follows the person to be protected until the person to be protected re-enters the coverage area. The drone may be configured to follow the person to be protected. The drone may include an implement, such as an arm, a stun gun, a claw, etc., used to interact with the environment around it. The drone may use the implement to attack a subject when the threat level exceeds a predetermined threshold in order to protect the person to be protected or other people from imminent harm. The drone may use artificial intelligence. The drone may also or instead include an audio alarm, warning system or other deterrent device or system that is triggered or otherwise activated based on or in response to the threat level exceeds a predetermined threshold. In some embodiments, the drone is equipped with a monitoring device used to obtain new security data. In some embodiments, the new security data obtained by the drone is used to modify the threat level.

Figure 8:
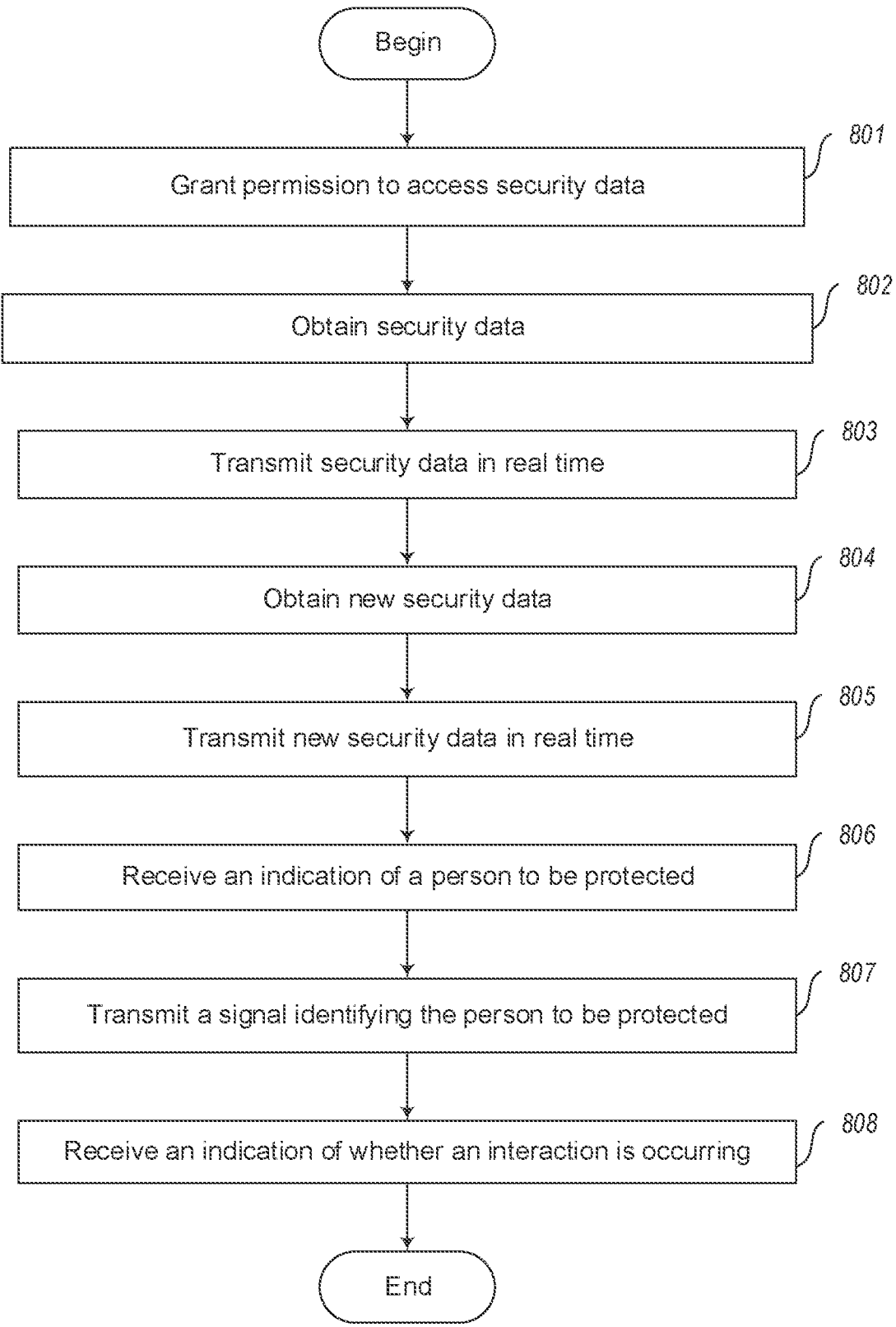
FIG. 8 is a flow diagram depicting a process including obtaining and sending security data in real time to one or more servers of an electronic monitoring and protection system, according to various embodiments described herein.

FIG. 8 is a flow diagram depicting a process including obtaining and sending security data in real time to one or more servers of an electronic monitoring and protection system 100, according to various embodiments described herein. At act 801, a user provides user input granting permission to obtain security data from one or more monitoring devices. At act 802, the electronic monitoring and protection system 100 obtains security data useful for determining a subject's danger index from one or more monitoring devices. At act 803, security data from the monitoring device is transmitted to the electronic monitoring and protection system 100 in real time as the security data is obtained by the monitoring device. At act 804, the monitoring device obtains new security data useful for modifying a subject's danger index. At act 805, the new security data is transmitted to the electronic monitoring and protection system 100 as it is obtained in real time.

At act 806, the user provides user input identifying a person to be protected. At act 807, a signal identifying the person to be protected is transmitted to the electronic monitoring and protection system 100. At act 808, the in indication of whether an interaction is occurring based on the security and the new security data is received from the electronic monitoring and protection system 100. In some embodiments, a threat level based on the danger index of a subject is received from the electronic monitoring and protection system 100. The electronic monitoring and protection system 100 may initiate an action based on the determined threat level. In some embodiments, an indication that an action has been initiated is received from the electronic monitoring and protection system 100. In some embodiments, the action includes transmitting a message regarding the threat level to a user device. The action may include transmitting, in real time, security data obtained from a monitoring device to a user device. In some embodiments, the user device receives a determination of the threat level based on the danger index of the one or more subjects and their interaction with the person to be protected. In some embodiments, the user device receives a message including information describing how to prevent a future interaction from reaching the determined threat level.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic monitoring and protection system, comprising:
   at least one processor;
   at least one memory coupled to the at least one processor, the memory having computer-executable instructions stored thereon that, when executed by the at least one processor, cause the system to:
     for each user of a plurality of users:
       electronically receive an indication from the user granting permission to one or more servers to access security data including one or more of audio security data and video security data resulting from monitoring of an area by at least one respective monitoring device associated with the user;
       based on the received indication, electronically receive the security data from the at least one respective monitoring device associated with the user; and
       electronically receive an indication from the user identifying at least one person to be protected by the electronic monitoring and protection system;

electronically identify one or more subjects and one or more characteristics of the one or more subjects based on received security data from respective monitoring devices of different users of the plurality of users;

electronically determine, based on one or more of: the received security data received from respective monitoring devices of different users of the plurality of users and new security data from respective monitoring devices of different users, an interaction is occurring or has occurred between the one or more subjects and the at least one person to be protected by the electronic monitoring and protection system; and electronically initiate an action when a threat level has exceeded a predetermined threshold for the at least one person to be protected by the electronic monitoring and protection system.

2. The electronic monitoring and protection system of claim 1, further comprising:

the memory further including additional instructions that, when executed by the at least one processor, further cause the at least one processor to:

electronically determine, based on one or more of: the received security data received from respective monitoring devices of different users of the plurality of users and the new security data from respective monitoring devices of different users, whether the at least one person to be protected can be located by the electronic monitoring and protection system; and electronically initiate an action when the at least one person to be protected cannot be located by the electronic monitoring and protection system.

3. The electronic monitoring and protection system of claim 1, wherein the computer-executable instructions, when executed by the at least one processor, further cause the at least one processor to:

electronically determine, based on one or more of: the received security data received from respective monitoring devices of different users of the plurality of users and the new security data from respective monitoring devices of different users, a location of the at least one person to be protected.

4. The electronic monitoring and protection system of claim 3, wherein the computer-executable instructions, when executed by the at least one processor, further cause the at least one processor to:

electronically determine, based on one or more of: the received security data and the new security data from respective monitoring devices of different users, that the at least one person to be protected is expected to travel to a geographic location before the at least one person to be protected begins to travel to the geographic location; and electronically determine an expected time for the at least one person to be protected to arrive at the geographic location based on one or more of: the location of the at least one person to be protected and the geographic location;

electronically determine whether the at least one person to be protected has arrived at the geographic location by the expected time; and electronically initiate an action based on the determination of whether the at least one person to be protected has arrived at the geographic location by the expected time.

5. The electronic monitoring and protection system of claim 4, wherein the electronically determining that the at least one person to be protected is expected to travel to the geographic location based on a conversation detected in one or more of the received security data and the new security data from respective monitoring devices of different users.

6. The electronic monitoring and protection system of claim 4, wherein the action is electronically initiated based on the determination that the at least one person to be protected has arrived at the geographic location, including transmitting a confirmation that the at least one person to be protected has arrived at the geographic location by the expected time to at least one user of the plurality of users.

7. The electronic monitoring and protection system of claim 4, wherein the electronically initiated action based on the determination that the at least one person to be protected has arrived at the geographic location, includes transmitting a confirmation that the at least one person to be protected has not arrived at the geographic location by the expected time to at least one user of the plurality of users.

8. The electronic monitoring and protection system of claim 1, wherein the computer-executable instructions, when executed by the at least one processor, further cause the at least one processor to:

electronically determine which geographic locations can be monitored by the electronic monitoring and protection system based on one or more of: the security data and the new security data;

electronically determine which geographic locations cannot be monitored by the electronic monitoring and protection system based on one or more of: the security data, the new security data, and the determined geographic locations that can be monitored by the electronic monitoring and protection system;

electronically determine whether the person to be protected is present at a geographic location that cannot be monitored by the electronic monitoring and protection system; and electronically initiate an action when the person to be protected is present in a geographic location that cannot be monitored by the electronic monitoring and protection system.

9. A non-transitory computer-readable storage medium, having computer executable instructions stored thereon that, when executed by at least one processor, cause the at least one processor to:

electronically identify one or more subjects and one or more characteristics of the one or more subjects based on security data received from respective monitoring devices of different users of a plurality of users having electronically granted permission to access the security data;

electronically determine, based on one or more of: the security data received from respective monitoring devices of different users and new security data from respective monitoring devices of different users, an interaction is occurring or has occurred between the one or more subjects and at least one person to be protected by an electronic monitoring and protection system;

electronically obtain location data describing a geographic location associated with one or more of: the one or more subjects and the at least one person to be protected based on the security data received from respective monitoring devices and the new security data received from respective monitoring devices; and based on a threat level for the at least one person to be protected, electronically dispatch a drone, based on the location data, to the geographic location.

10. The non-transitory computer-readable storage medium of claim 9, wherein the computer executable instructions, when executed by at least one processor, further cause the at least one processor to electronically cause the drone to emit a noise based on the threat level.

11. The non-transitory computer-readable storage medium of claim 9, wherein the computer executable instructions, when executed by at least one processor, further cause the at least one processor to:
electronically determine, based on one or more of: the security data received from respective monitoring devices and the new security data from respective monitoring devices of different users, whether the at least one person to be protected can be detected by at least one of the respective monitoring devices; and
electronically modify the location data to include data indicating the last known geographic location of the at least one person to be protected based on one or more of: the security data received from respective monitoring devices and the new security data from respective monitoring devices of different users.

12. The non-transitory computer-readable storage medium of claim 9, wherein the computer executable instructions, when executed by at least one processor, further cause the at least one processor to:
electronically determine which geographic locations can be monitored by the electronic monitoring and protection system based on one or more of: the security data and the new security data;
electronically determine which geographic locations cannot be monitored by the electronic monitoring and protection system based on one or more of: the security data, the new security data, and the determined geographic locations that can be monitored by the electronic monitoring and protection system;
electronically predict whether the person to be protected will be present at a geographic location that cannot be monitored by the electronic monitoring and protection system based on the security data and the new security data; and
electronically cause the drone to follow the person to be protected when the electronic monitoring and protection system predicts that the person to be protected will be present at a geographic location that cannot be monitored by the electronic monitoring and protection system.

13. A method in an electronic monitoring and protection system, the method comprising:
electronically receiving, by at least one processor, an indication from a user granting permission to electronically obtain one or more of audio security data and video security data;
based on the received indication granting permission, electronically obtaining, by at least one processor, the security data, the security data being usable to identify one or more subjects and one or more characteristics of the one or more subjects;
based on the received indication granting permission, automatically sending, by at least one processor, a signal including the security data in real time to one or more servers of the electronic monitoring and protection system;
electronically obtaining, by at least one processor, new security data;
automatically sending, by at least one processor, a signal including the new security data in real time to one or more servers of the electronic monitoring and protection system;
electronically receiving, by at least one processor, an indication from the user indicating at least one person to be protected;
automatically sending to one or more servers of the electronic monitoring and protection system, by at least one processor, a signal including the indication indicating the at least one person to be protected; and
electronically receiving, by at least one processor, based on one or more of: the received security data and the new security data, an indication from one or more servers of the electronic monitoring and protection system that an interaction is occurring or has occurred between the one or more subjects and the at least one person to be protected.

14. The method of claim 13, further comprising:
electronically receiving from one or more servers of the electronic monitoring and protection system, by at least one processor, a determination of a threat level based on a danger index assigned to the one or more subjects and the interaction between the one or more subjects and the at least one person to be protected.

15. The method of claim 14, further comprising:
electronically receiving from one or more servers of the electronic monitoring and protection system, by at least one user device, a determination of a threat level based on the danger index assigned to the one or more subjects and the interaction between the one or more subjects and the at least one person to be protected.

16. The method of claim 14, wherein the at least one processor is a processor of a monitoring device of the user.

17. The method of claim 14, further comprising:
electronically receiving from one or more servers of the electronic monitoring and protection system, by the at least one user device, a message including information describing how to prevent a future interaction from reaching the determined threat level.

18. The method of claim 13, further comprising:
electronically initiating an action based on the determined threat level.

19. The method of claim 13, further comprising:
receiving an indication that an action has been initiated based on the determined threat level.

20. The method of claim 19, wherein the action includes electronically transmitting a message regarding the determined threat level to at least one user device of the user.

* * * * *